March 6, 1928.                   1,661,471
H. GEORGE
BRAKE RIGGING FOR RAILWAY TRUCKS
Filed April 18, 1927        2 Sheets-Sheet 1

INVENTOR
Harvey George.
BY
ATTORNEY

March 6, 1928. 1,661,471
H. GEORGE
BRAKE RIGGING FOR RAILWAY TRUCKS
Filed April 18, 1927 2 Sheets-Sheet 2
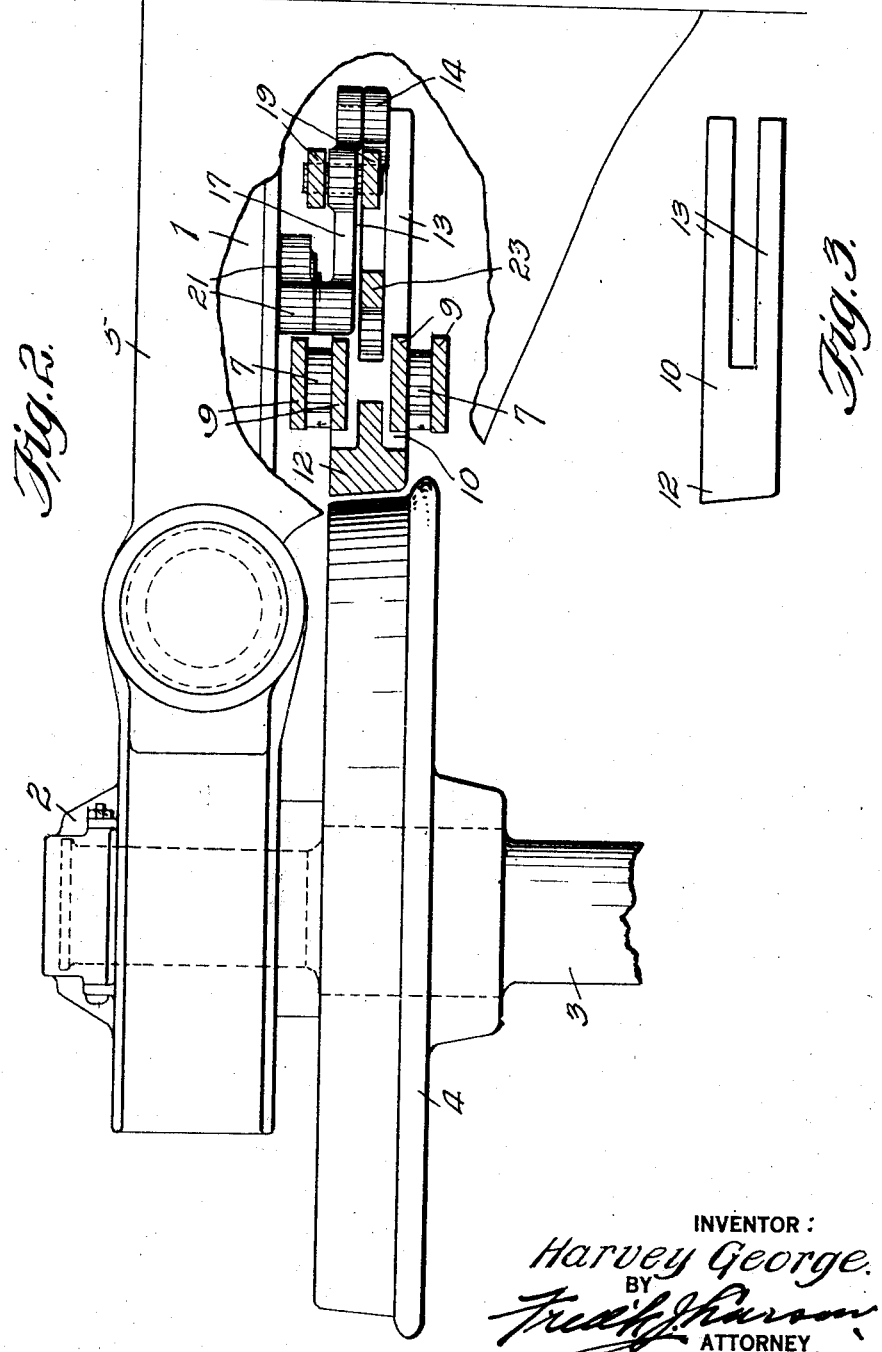
INVENTOR:
Harvey George.
BY
ATTORNEY.

Patented Mar. 6, 1928.

1,661,471

UNITED STATES PATENT OFFICE.

HARVEY GEORGE, OF ST. LOUIS, MISSOURI.

BRAKE RIGGING FOR RAILWAY TRUCKS.

Application filed April 18, 1927. Serial No. 184,587.

My invention relates to brake rigging for railway trucks, and, it is a distinct and practical improvement to overcome certain practical objections to, and defects in the present types of brake rigging, such as the brake shoes wearing uneven, or thin at one end due to the fact that the friction between the wheel and brake shoe, when the brakes are applied tends to cause the brake head to revolve around the brake hanger pin causing more pressure to be exerted against one end of the brake shoe than at the other end thereof.

The object of my invention is to provide a brake rigging whereby the braking effect of the brake shoe will be evenly transmitted to the car wheel rim under all car loads, by maintaining at all times perfect concentric relation of the braking face of the brake shoe with the peripheral face of the car wheel.

A further object of the invention is to provide means whereby to cause the longitudinal axis of the brake head to always remain in alignment with the center of the car wheel, regardless of the car load, thereby causing the braking face of the brake shoe to always remain in concentric relation with the wheel rim to prevent uneven wear thereof during braking effects.

A further object of the invention is the provision of brake rigging for railway trucks which possesses advantages in points of simplicity and efficiency, and, at the same time proves itself comparatively inexpensive in cost of manufacture.

With the above and other objects in view, the invention consists in the novel features of construction, arrangement and combination of parts hereinafter more fully described and finally pointed out in the claims hereto appended.

Referring to the accompanying drawings forming a part of this specification, wherein like characters of reference denote similar parts throughout the several views:

Fig. 2, is a top plan view with portions of the truck frame broken away.

Fig. 3, is a top plan view of the brake head.

Figure 1:
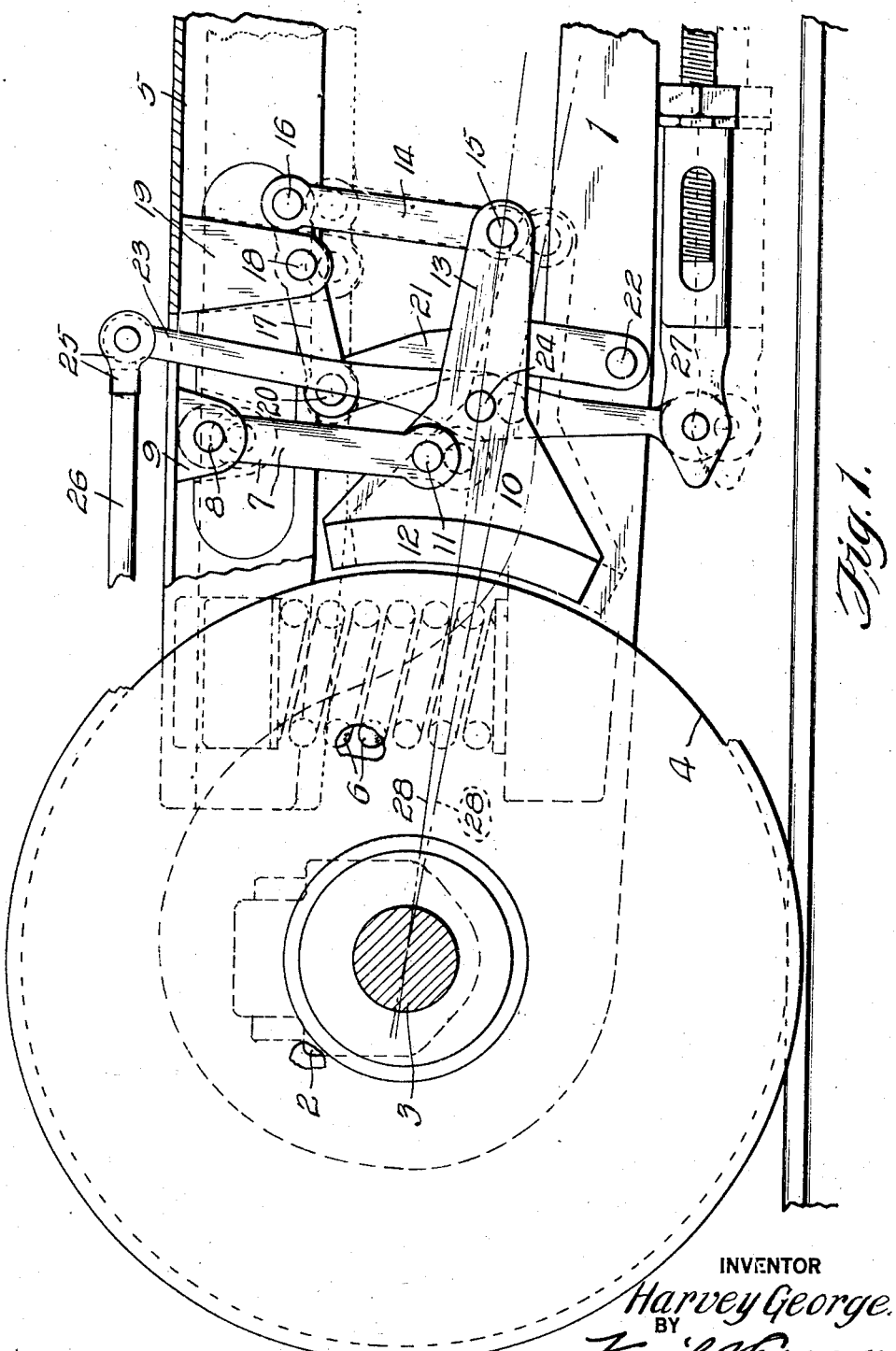
Fig. 1, is a longitudinal sectional view of a portion of a railway truck showing the brake rigging adjacent one of the brakes in side elevation.

Referring to the drawings, the reference character 1 designates a portion of a relatively stationary lower frame member of a railway truck having each end provided with the usual journal box 2 with the axle 3 of the wheel 4 therein, and 5 designates the upper frame member of the truck which is supported at each end upon a coiled spring 6 resting upon the lower frame member to allow the upper frame member to move up and down with relation to the lower fixed frame member 1.

In carrying out the aim of my invention, I employ a pair of spaced brake head hanger members 7 which are carried by the pins 8 supported by the ears 9 forming a part of the upper frame member 5. A suitable brake head 10 is carried between the lower ends of the hanger members 7 by means of a pivot pin 11 which passes through the hangers and the brake head at a convenient balancing point. One end, the enlarged end of the brake head 10 is provided with the usual brake shoe 12. The opposite end of the brake head 10 is provided with a suitable bifurcated arm extension 13. The free end of the brake head arm extension 13 is connected to the lower end of a balancing hanger member 14 by means of a pivot pin 15. The upper end of the balancing hanger member 14 is pivotally connected by means of the pin 16 to one end of a rocker arm 17, which arm is pivotally connected by means of the pin 18 to the ears 19 carried by the upper frame member 5. The opposite end of the rocker arm 17 is connected by means of the pivot pin 20 to the upper end of lever member 21 which itself is connected at its lower end by means of the pivot pin 22 to the lower frame member 1.

The numeral 23 designates a brake lever, in this instance the live one, which is pivotally connected to the brake head 10 by means of the pivot pin 24. The upper end of this lever is connected in railway truck construction to a lever equalizer bar 25 which is shifted by means of the usual pull rod 26. The lower end of the brake lever 23 has connection with one end of a turn buckle connection 27 which in turn has connection at its opposite end in the usual manner with a brake lever, which is a dead one and which is not shown in the drawings for the sake of clearness and brevity.

The brake rigging herein described has not a fixed position relative to the truck frames and wheels and therefore will not maintain the same relative position between the brake shoes and the wheels due to the fact that it is carried by the upper, or spring supported frame member which is movable vertically according to the load carried thereby; thus, the angle formed between the center line of a wheel and a line 28 drawn from the center of the wheel to the center of the brake shoe on the wheel rim is not always the same, but due to the connected members 14, 17 and 21, the longitudinal center line, or axis of the brake head will always be in alignment with the center of the wheel, thus insuring even and smooth braking action of the brake shoes when being applied regardless of the load carried by the upper frame member which load varies the position of the upper frame member relative to the lower frame member 1.

In operation:—

Any vertical movement of the upper frame member causes the rocker arm to rock upon the pivot pin moving the rear hanger causing it to move faster than the front hanger and sets up a pivot motion to the brake head through its pivot connection with the front hangers, thus keeping the brake shoe in perfect concentric relation with the rim of the wheel at all times by maintaining the longitudinal axis of the brake head at all times in a straight line with the center of the wheel. The lever connections 14, 17 and 21 prevent the brake head from undue rotation upon the pivot pin 11 of the front hangers when the brakes are being applied and thereby compels an even wear of the brake shoe. The alignment of the longitudinal axis of the brake head in a straight line with the center of the car wheel at all times prevents any possibility of an uneven wearing of the brake shoes as the braking face of the shoes will always be held in perfect concentric relation with the peripheral face of the wheel rim.

The many advantages of the herein described invention will readily suggest themselves to those skilled in the art to which it appertains.

I do not wish to be understood as having limited myself to the exact details of construction shown and described, but desire to have it understood that the invention I have shown in the drawings is merely illustrative, as it is manifest that various minor changes may be made in the exact construction and particular arrangement of parts without departing from the spirit of my invention, hence I reserve the right to make any such changes as may fairly fall within the scope of the appended claims when fairly construed.

What I claim is:

1. In a brake rigging for railway trucks having a spring supported vertically movable upper frame member and a relatively stationary lower frame member, a brake head including a brake shoe, an arm extension for said brake head, hangers pivotally suspending from the upper frame member and means actuated by the up and down movement of the upper frame member for imparting movement to the brake head to always maintain concentric relation of the brake shoe with the wheel by maintaining the longitudinal axis of the brake head in a straight line with the center of the wheel.

2. In a brake rigging for railway trucks having a spring supported vertically movable upper frame member and a relatively stationary lower frame member, a brake head including a brake shoe, an arm extension for said brake head, hangers pivotally suspending from the upper frame member and means actuated by the movement of the upper frame member for imparting balancing movement to the brake head to maintain the longitudinal axis of the brake head in a straight line with the center of the wheel of the truck to retain the braking face of the brake shoe in concentric relation with the rim of the wheel during the change of position of the brake shoe relative to the wheels to insure an even smooth braking action and prevent brake shoe chatter and uneven wear thereof.

3. In a brake rigging for railway trucks having an upper movable frame member and a relative stationary lower frame member, a brake head including a brake shoe, an arm extension for said head, front hangers carried by a movable frame member of the truck having connection at their lower ends with the brake head at a convenient balancing point, a rocker arm pivotally connected to the movable frame member, a hanger member connecting the free end of the brake head arm extension with one end of the rocker arm and a pivotally held supporting member carried by the lower frame member of the truck, the upper end of which has pivotal connection with the opposite end of the rocker arm.

4. In combination with a railway truck having a lower frame member, wheels and a spring supported vertically movable frame member, of a brake head carrying a brake shoe, hangers for brake head, an arm extension directed from said brake head, a rocker arm pivotally supported by said upper frame member, a hanger connecting the arm extension with one end of the rocker arm and a member pivotally connected at its lower end to the lower frame member and having its upper end pivotally connected with the opposite end of said rocker arm.

5. In combination with a railway truck having a lower frame member, wheels and a spring supported vertically movable frame member, of a brake head carrying a brake shoe, hangers for brake head, an arm extension directed from said brake head, a rocker arm pivotally supported by said upper frame member, a hanger connecting the arm extension with one end of the rocker arm, a member pivotally connected at its lower end to the lower frame member and having its upper end pivotally connected with the opposite end of said rocker arm and a brake lever pivotally carried by said brake head.

In testimony whereof I have hereunto affixed my signature.

HARVEY GEORGE.